United States Patent [19]

Curran et al.

[11] Patent Number: 4,703,741
[45] Date of Patent: Nov. 3, 1987

[54] GASOLINE COMBUSTION ENGINE

[76] Inventors: Jeffrey M. Curran, 39 Lewis St., Canton, Mass. 02021; Jeffrey D. Weaver, 112 Plymouth St., Bridgewater, Mass. 02324; Robert A. Weaver, Box 1841, Conway, N.H. 03818

[21] Appl. No.: 651,457

[22] Filed: Sep. 17, 1984

[51] Int. Cl.⁴ .................. F02G 5/00; F02M 15/00
[52] U.S. Cl. .................................. 123/557; 48/189.2
[58] Field of Search ............. 123/557, 552, 558, 514, 123/516, 545; 48/189.2

[56] References Cited

U.S. PATENT DOCUMENTS

| | | | |
|---|---|---|---|
| 2,254,634 | 9/1941 | Tomsic | 123/557 |
| 2,746,440 | 5/1956 | Eriksen | 123/552 |
| 3,354,872 | 11/1967 | Gratzmuller | 123/557 |
| 3,509,859 | 5/1970 | Pantano | 123/557 |
| 3,788,292 | 1/1974 | Lee | 123/545 |
| 3,855,980 | 12/1974 | Weisz | 123/557 |
| 4,151,821 | 5/1979 | Wichman | 123/557 |
| 4,223,652 | 9/1980 | Budnicki | 123/557 |
| 4,249,502 | 2/1981 | Hover | 123/558 |
| 4,448,176 | 5/1984 | Hoppie | 123/558 |
| 4,458,653 | 7/1984 | Geddes et al. | 123/554 |
| 4,476,840 | 10/1984 | Budnicki | 123/558 |
| 4,515,135 | 5/1985 | Glass | 123/558 |

Primary Examiner—Craig R. Feinberg
Assistant Examiner—David A. Okonsky
Attorney, Agent, or Firm—Alvin Isaacs

[57] ABSTRACT

A novel system for introducing a combustible liquid fuel into a gasoline combustion engine to obtain substantially perfect combustion and thereby prevent pollution, which system comprises heating means for elevating the temperature of the liquid gasoline fuel above its critical temperature, thereby converting it to its gaseous state; pressure means for providing a positive pressure as the liquid fuel is transported to the heating means; and means for discharging and rapidly expanding the gaseous fuel into the mixing chamber of the engine where it is admixed with air to provide a combustible mixture for burning and operation of the engine, the pressure means providing a pressure sufficient to maintain the fuel in its gaseous state immediately after it is discharged from the heating means into the mixing chamber.

23 Claims, 1 Drawing Figure

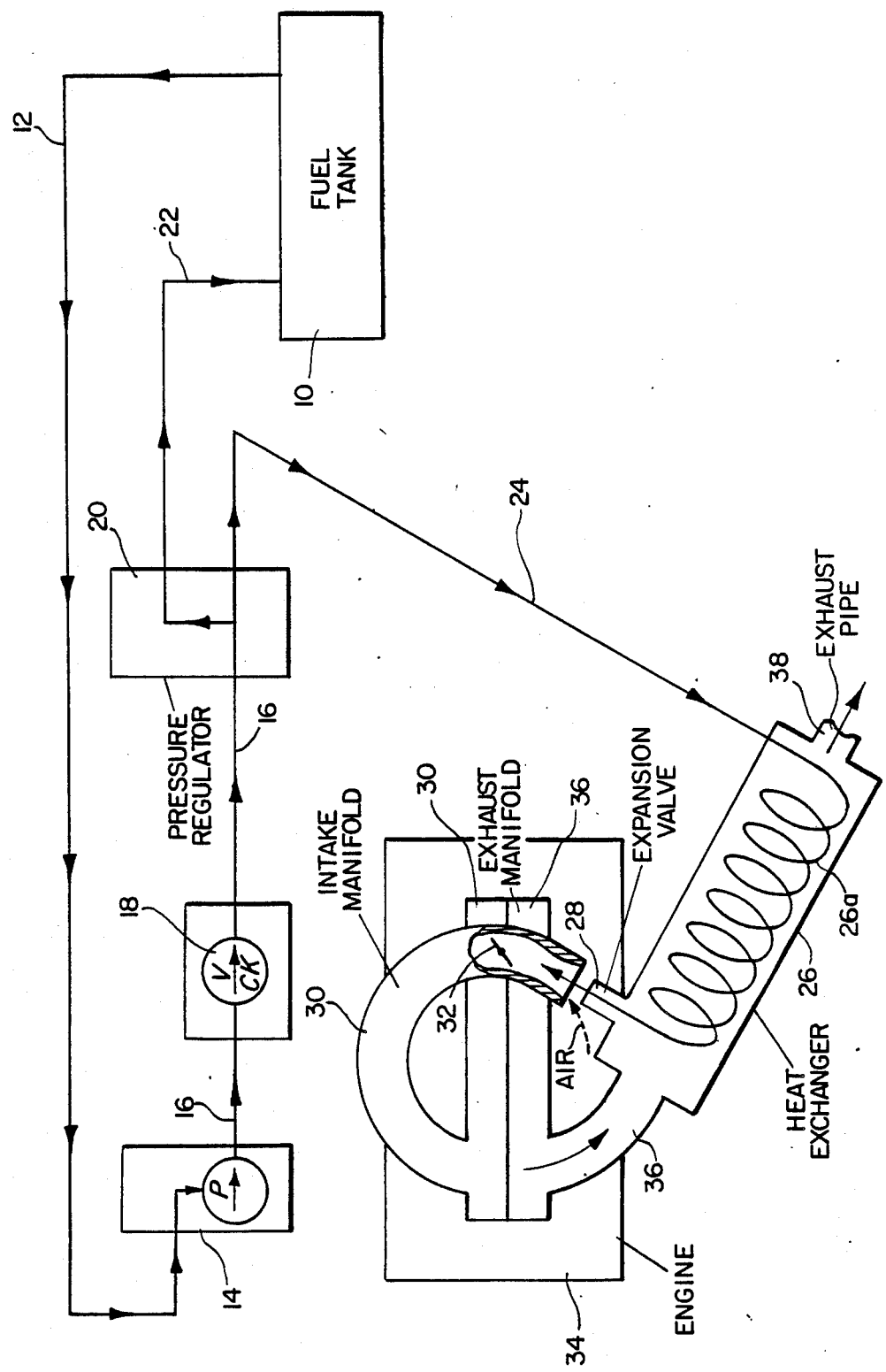

GASOLINE COMBUSTION ENGINE

BACKGROUND OF THE INVENTION

1. Field of the Invention

This invention relates to fuel powered engines and, more particularly, to the prevention of air pollution in gasoline internal combustion engines such as those generally employed in motor vehicles. Since the problem to which the invention is particularly directed is most acute and best understood in the operation of gasoline-powered motor vehicles, the invention will hereinafter be described in detail by reference thereto.

2. Background of the Prior Art

Great effort has been focused on the problem of air pollution from combustion engines, notably automobiles. Generally speaking, these efforts have been directed towards one of the following two solutions: (1) devices located in the exhaust portion of the automotive engine in order to filter or decompose the exhaust gases; or (2) the use of so-called catalytic converters to upgrade or crack the low octane motive fluids to the point where only light hydrocarbon gases are introduced for generation of power in the engine. As illustrative of the latter approach as well as brief mention of the former, mention may be made of U.S. Pat. No. 3,855,980 issued to Weisz et al.

According to this patent, fuel of a relatively low octane number is passed through a hydrocarbon catalytic converter operated at temperatures above 600° F., the catalytic converter containing a crystalline aluminosilicate catalyst having a specified pore structure and alpha value wherein the relatively low octane number fuel is said to be converted into relatively high octane fuel for operation of the engine.

Over the years research has also been directed towards various systems for improving the efficiency of internal combustion engines by vaporization of the fuel to achieve more complete combustion.

For instance, U.S. Pat. No. 1,138,575 issued to Knaak is directed to a system wherein a heavy oil may be used and thorough vaporization thereof obtained. According to this patent, the oil is heated under pressure up to substantially its cracking point at atmospheric pressure. The pressure is maintained up to the time of its admission into the cylinder. As soon as it is admitted, a large portion consisting of the more volatile matter immediately vaporizes by reason of the pressure being released. In the patented procedure it is said that the volatile constituents of the oil by their expansion assist the vaporization of the heavier constituents, while the entire oil charge is further assisted in vaporization by a charge of hot air admitted adjacent to the oil spray and adapted to mix intimately therewith.

U.S. Pat. No. 2,218,922 issued to Newbury discloses a system for providing a fuel mixture having the proper proportions of gas and air, including a vaporizing chamber connected to the intake manifold and into which a liquid fuel is introduced, an inlet chamber into which exhaust gases are introduced and an outlet chamber into which the exhaust gases are discharged. Vapors produced in the vaporizing chamber are conducted into a mixing chamber where air is introduced to provide the desired mixture.

U.S. Pat. No. 2,982,528 issued to Shelton discloses a carburetor for use in a vapor fuel system including a heater for vaporizing fuel in the carburetor.

U.S. Pat. No. 3,294,381 issued to Schwartz relates to a carburetor in which the fuel is treated by hot exhaust fumes before it is combined with air and fed to the internal combustion engine, in order to increase its efficiency. The fumes-laden fuel is circulated in a manner to free it of inordinately large globules of fuel, thereby insuring that only finely divided and pre-heated fuel of mist-like consistency is directed to the engine intake manifold.

U.S. Pat. No. 3,496,919 issued to Gerrard is directed to the problem that carburetors presently in use deliver much of the fuel and particularly that of the heavier fraction boiling point into the cylinder in an unvaporized condition and during the heat of combustion there is insufficient oxygen present to burn the fuel to release all of the energy stored in the fuel. As a result, a large portion of the energy contained in the fuel is not used and is passed out the exhaust pipe and wasted and the surrounding air is contaminated with these products of combustion. According to the patent, both the lighter and heavier fractions of the fuel are vaporized by first passing them in heat exchange relation to an available heat supply before delivery to the combustion chamber.

U.S. Pat. No. 3,630,698 issued to Baldwin discloses a fuel system for feeding gasoline vapor directly into the intake manifold wherein the liquid gasoline is vaporized into a highly combustible vapor which is then mixed with the necessary amount of air in a venturi section, and this mixture is ultimately fed directly into the manifold. The patented system, which eliminates the carburetor and fuel pump, includes a closed evaporating chamber and delivery tube means communicating between the evaporating chamber and intake manifold for effecting a vacuum in the chamber and for vaporizing the fuel contained therein.

U.S. Pat. No. 3,653,643 issued to Tucker is concerned with providing for the complete combustion of liquid fuel in an internal combustion engine with a corresponding decrease of air pollutant in the exhaust. This is said to be achieved by supplying a completely vaporized or dry gas to the combustion chamber. The primary air for the mixture is initially filtered and then passed through a vaporizing filter immersed in the liquid fuel which breaks the primary air up into small bubbles to increase the surface area available for evaporation of the liquid fuel. Secondary air is then added to the enriched fuel-air mixture prior to admission into the combustion chamber.

U.S. Pat. No. 2,796,855 issued to Schumacher relates to the problem of a small portion of the fuel condensing and accumulating in the form of fine droplets or as a film on the interior surface of the inlet manifold of the engine and thereby adversely affecting the combustibility of the fuel and air mixture. This problem is said to be solved by heating the fuel and maintaining it in a liquid state at a comparatively high temperature and pressure prior to its introduction into the combustion chamber. As the heated liquid fuel flows into the combustion chamber, the pressure upon the liquid is completely released and the liquid fuel immediately vaporizes and issues in the form of a jet.

Finally, U.S. Pat. No. 4,083,340 issued to Furr et al is directed to the concept of heating gasoline under pressure to a temperature higher than its normal boiling point while maintaining it liquid by means of pressure. According to the patent, when the pressure is released, every particle of the gasoline becomes instantly gaseous and mixes thoroughly and evenly with the air rather than forming a mixture of gaseous gasoline, air and droplets of liquid gasoline. Although it is stated in Col. 6 that the patented system was favorably tested on two different automobiles, it is not explained how the patentees solved the problem of vapor lock which applicants find will occur when the fuel heated above its boiling point but maintained in the liquid state is introduced into the conventional carburetor of an automobile.

While the foregoing survey is not intended to be a complete one of the prior art patents, it is believed to be illustrative of the state of the art with respect to the subject matter of the present invention.

Although it can be said that the prior efforts have achieved some success in improving the efficiency of combustion engines and in reducing hydrocarbon and carbon monoxide pollution, it nevertheless remains an acute problem, particularly in areas of dense vehicular population. Recognizing the inability of the prior approaches to provide a satisfactory solution, existing legislation which has been enacted to reduce pollution is in the form of a compromise permitting certain maximum levels of pollutants to be discharged from the exhaust system. However, since the amount of pollution is the sum total of emission of pollutants from all of the vehicles in a given area, it is clear that merely limiting the degree of pollution from a single vehicle is not a satisfactory solution to the problem. Accordingly, a very great need still exists for a better system to control pollution from combustion engines.

The present invention is directed to this great need.

SUMMARY OF THE INVENTION

As was heretofore described in the discussion of the prior art, while various proposals have been suggested, the thrust of the efforts to reduce or inhibit air pollution have been directed to employing devices in the exhaust system to filter or decompose the exhaust products of incomplete combustion. This approach can be likened to the medical treatment of a disease after it occurs. Much like preventative medicine is instead directed towards preventing the disease from occurring, the present invention, on the other hand, is directed to the source of the problem and has for its primary objective to obtain perfect combustion so that there are no pollutants to be transmitted to the exhaust system.

According to the present invention, this objective is accomplished by the simple and elegant expedient of introducing the fuel into the intake manifold in a true gaseous state, as distinguished from a vapor, as is disclosed in certain of the aforementioned patents.

The present invention can be said to be predicated upon the theory that a fuel in its gaseous state will combine with oxygen much more fully and with greater ease than the same fuel in its liquid state. At lower temperatures, collisions between liquid molecules are of low energy and individual molecules may be unaffected. However, it has been established that at elevated temperatures, the thermally activated molecules are involved in high-energy collisions causing fragmentation or dissociation into atomic constituents or free radicals. These fragments react with oxygen with great rapidity, and combustion usually proceeds by a chain reaction involving these fragments.

The conventional carbureted engine emloyed in automobiles uses a combination of vacuum and low heat to vaporize fuel prior to its introduction into the combustion chambers. Since there is incomplete combustion resulting in exhaust emissions, namely hydrocarbons and carbon monoxide, it is therefore postulated that by converting liquid fuel to its gaseous state, efficiency can be fully reached so that emission of pollutants is effectively eliminated.

In accordance with the present invention, these objectives are accomplished simply and efficiently by introducing the liquid gasoline under pressure into a heat exchanger or other heating means, where the temperature of the fuel is raised above its critical temperature, i.e. the temperature at which liquefication cannot occur regardless of the pressure. The gasoline thus heated to its gaseous state and above its critical temperature is maintained under pressure, e.g. on the order of 80 psi and introduced through appropriate valve means into the mixing chamber where it is to be admixed with air to provide the combustible mixture for burning and operation of the engine. The rapid expansion undergone as the gaseous fuel components are discharged under pressure from the heating means compensates for the heat lost as the fuel is discharged into the mixing chamber. The gaseous fuel is then thoroughly admixed with the proportionate amount of air as it passes into the partial vacuum of the intake manifold or other mixing chamber. The resultant homogeneous, liquid-free mixture then combusts with complete efficiency.

The invention will be more fully understood by reference to the following detailed description taken in conjunction with the illustrative drawing.

BRIEF DESCRIPTION OF DRAWING

The FIGURE is a diagrammatic view illustrating a typical combustion engine having the novel fuel introducing system of this invention.

DETAILED DESCRIPTION OF THE INVENTION

As was mentioned previously, while much effort has been made to abate the problem of air pollution from combustion engines, notably motive engines, the problem, though lessened, still remains. The amount of effort which has been exerted in research to solve the pollution problem may be forcefully demonstrated by reference to the "LEXPAT" data base of Mead Data Central which indicates that from its reporting base in 1975 to July of 1984, some 1,194 U.S. patents disclose or relate in some way to air pollution from combustion engines.

While the present invention also relates to this problem, as will be demonstrated hereinafter by reference to analytical test data, it is not merely another unsatisfactory or incomplete proposed solution. Instead, it has been found to reduce hydrocarbon and carbon monoxide pollutants in the exhaust to zero.

The essence of the invention can be described as a system for introducing the liquid fuel involving two critical elements: (1) the gasoline is heated not just to the temperature where it vaporizes, but beyond that and above its critical temperature to its gaseous phase; and (2) the liquid fuel is fed into the system from its fuel source under a pressure which is maintained until the gaseous fuel is discharged from the heat source and rapidly expands into the mixing chamber for admixture with air, the pressure as initiated and maintained being sufficient not merely to prevent backflow, but to create a pressure such that the gaseous fuel is expelled from the heat source under pressure and rapidly expands into the mixture chamber. In this manner it maintains its gaseous state.

The essence of the invention may accordingly be defined as means for introducing a liquid fuel into the mixing chamber of a gasoline combustion engine where it is admixed with air to provide a combustible mixture for burning and operation of the engine, which means comprises heating means for elevating the temperature of the liquid fuel above its critical temperature, thereby converting it to a gas; means for transporting the liquid fuel from the gas tank or other fuel source to this heating means; pressure means for providing a positive pressure in the system as the liquid fuel is transported to the heating means; and means for releasing the fuel as a gas into the mixing chamber, the pressure means providing a pressure sufficient to cause the fuel to expand rapidly.

As used herein and in the appended claims, the term "critical temperature" is given its ordinary meaning, namely the temperature above which a substance can exist only in the gaseous state regardless of the pressure applied. The critical temperature for the typical gasoline fuel employed in automotive engines is on the order of about 675° F. [about 357° C.]. However, to be on the safe side, the fuel is preferably heated beyond this point, e.g. to at least 700° F. [about 371° C.]. The heat source is not critical and may vary according to individual whim or design. However, a conventional heat exchanger utilizing the heat from exhaust gases to achieve the desired temperature is simple and efficient and hence preferred.

The pressure to be initiated and maintained may vary and can be readily ascertained by routine experimentation by the skilled worker. Applicants have found pressures on the order of 80 pounds per square inch (psi) to be fully operative and readily obtainable with commercially available equipment. However, it is to be understood that the invention is not restricted to such precise pressures and lower pressures, e.g. on the order of 65 psi may also be employed.

The pressure source is also not critical and various means for initiating and maintaining the required pressure will be readily suggested to the skilled worker in the light of this disclosure. The preferred pressure source is the simplest and the one that should be most apparent, namely a pressure pump. The conventional fuel pump as typically used in automobiles today only provides a pressure on the order of five psi and is therefore totally inadequate for use in the present invention. However, commercially available electric high pressure fuel pumps, such as would be employed in fuel injection systems, and which produce a pressure as heretofore mentioned, may be employed in the practice of this invention.

Suitable means for maintaining the pressure, e.g. conventional pressure regulators, will also be readily suggested and per se comprise no part of this invention.

From what has been described, it will be appreciated that the present invention is, in essence, a system utilizing an arrangement of commercial or readily obtainable components to accomplish the stated fuel induction, as distinguished from inventions which rely for patentable novelty upon a new element or a patentably different variation or modification in shape, structure or design to accomplish a given purpose or objective. For this reason, the invention will be easily understood from the accompanying diagrammatic sketch and a detailed showing of the structure of the individual elements is accordingly unnecessary. It will of course be appreciated that elements of the combustion engine not shown, e.g. pistons, cylinders and the like, are quite conventional and their construction and arrangement with respect to the other elements shown in the drawing will be well understood by those skilled in the art.

As shown in the illustrative view of a typical internal combustion engine embodying this invention, liquid fuel from tank 10 is conveyed by a suitable line or conduit 12 to fuel pump 14, a conventional electric high pressure fuel pump of the type employed in fuel injection systems to provide a pressure as heretofore described, e.g. on the order of 80 psi. The liquid fuel under pressure from pump 14 is then transported through line 16 through a one way flapper valve or ball check valve 18 of known structure and then through a pressure regulator 20 whose function is to maintain the pressure at or near the level initiated by pump 14 or in any event at the necessary level. Pressure regulator 20 has a two-way valve means by which a substantial portion of the liquid fuel, e.g. as much as 90%, is recirculated by line 22 back to fuel tank 10, the remaining portion being transported by line 24 to heat exchanger 26 under constant pressure generated by the fuel pump and maintained by the pressure regulator. Heat exchanger 26, which may for example, be a simple oxygen-free heat exchanger having stainless steel coils 26a over which the exhaust [or other heating] gases pass, serves to convert the liquid fuel in coils 26a to its gaseous state by elevating the temperature above the critical temperature, e.g. to at least 700° F., as heretofore discussed. The gas then passes from coils 26a through expansion or metering valve 28 having a small orifice into intake manifold 30 where it is to be admixed with air to provide the combustible mixture.

Expansion valve 28 is of a per se known needle valve construction adjustable for regulating or metering the rate of gas discharge to achieve the desired gas-air ratio in the mixing chamber. (It will be appreciated that, to avoid undue replacement, valve 28 should preferably be adapted to withstand the elevated pressure and heat employed in accordance with this invention.)

Air from a source (not shown) flows into the intake manifold, as shown by the arrow, through butterfly valve 32 to provide the combustible gas-air mixture in the intake manifold 30. As will be appreciated by those skilled in the art, valve 32 is also adjustable and valves 32 and 28 are regulated to achieve the prescribed mixture for operation of the particular engine. For automobiles, this typically may be on the order of 15:1 air to gas, but this will of course vary for the particular engine and/or for the desired mixture, whether "lean" or not.

The gas-air combustible mixture then passes through the respective cylinder intake valves (not shown) and ignition and operation of engine 34 proceeds in per se known manner. The clean, pollutant-free exhaust gases then are discharged from the respective cylinders through exhaust valves (not shown) into exhaust manifold 36. The exhaust gases then proceed through heat exchanger 26 to heat fuel in coils 26a, as described, and are finally released into the ambient air through exhaust pipe 38, only a section of which is shown in the drawing.

In the illustrative drawing, the gas-air mixture has been shown to take place in the intake manifold. However, the invention is not restricted thereto and other elements may be employed as the mixing chamber as recited above and in the appended claims. For example, it is visualized that the mixture may take place in the cylinders themselves.

In the foregoing desription, it has been stressed that it is critical that the liquid fuel be heated above its critical temperature, namely the temperature above which a substance can exist only in the gaseous state, regardless of the pressure applied.

It is equally imperative for a clear understanding of the invention in turn to understand the distinction between a gas and a vapor, as disclosed, for example, in certain of the aforementioned patents. As the temperature of the liquid fuel is raised, it is first converted from the initial liquid state to a temperature at which it vaporizes. A vapor is defined as a substance in its gaseous state, but below its critical temperature. A body of vapor is not subject to all of the laws of gases. For instance, if the space occupied by it is diminished without change of temperature, there is no increase in pressure, but instead part of the vapor condenses. Applicants have found that when the fuel to be admixed with air is introduced through the metering valve into the mixing chamber below its critical temperature, there will be incomplete combustion which in turn will result in the presence of pollutants in the exhaust, as heretofore discussed.

However, when the temperature is raised still further beyond the temperature where vaporization will occur and, further, above the critical temperature, as contemplated by the present invention, the liquid fuel enters the gaseous state where perfect combustion is obtained.

To illustrate the efficacy of their invention, applicants, all residents of the Commonwealth of Massachusetts, tested their concept in a 250 cubic inch 6 cyl. Pontiac with the Sun Electric computerized exhaust analyzer in use in Massachusetts by the Division of Motor Vehicles for the state inspection of vehicles. [Under current law, all motor vehicles in the Commonwealth are required to pass this inspection once a year in order to be registered for operation in the state.] The computerized analyzer issues the following information: (1) permissible levels of unburned hydrocarbons in the exhaust for the particular make and year of the vehicle tested; (2) actual levels of these hydrocarbons present in the exhaust; (3) permissible levels of carbon monoxide for the particular vehicle; (4) actual levels of carbon monoxide found in the exhaust; (5) uncombined oxygen in the exhaust; (6) carbon dioxide in the exhaust; and (7) engine speed during the test. The last three are not material for purposes of this application: carbon dioxide along with water are harmless byproducts of combustion; uncombined oxygen refers to excess oxygen that the engine draws in but is not needed for combustion; and the engine speed requires no further explanation.

For the particular vehicle tested, the analyzer reported the acceptable levels of pollutants which would pass inspection to be: 800 parts per million (ppm) of unburned hydrocarbons and 7.00% carbon monoxide. The actual levels found with the novel system of this invention were 0.00 parts per million of unburned hydrocarbons and 0.00% carbon monoxide, thereby indicating perfect or 100% combustion with no pollutants in the exhaust.

While not relevant, for the sake of full reporting of the results of this test, it also indicated 13.46% of the harmless carbon dioxide; 8.3% uncombined oxygen; and 628 revolutions per minute (RPM) engine speed.

As was mentioned previously, considerable progress has in fact been made in reducing automobile pollution. For example, in the Commonwealth of Massachusetts, acceptable levels of hydrocarbons and carbon monoxide for purposes of passing state inspection for pre-1970 vehicles were 1200 ppm. and 9%, respectively; for 1970-1974 vehicles, these levels were reduced to 800 ppm. and 7%, respectively; for 1975-1979 vehicles, 400 ppm. and 4%, respectively; for 1980, 300 ppm. and 2.7% respectively; and, finally, for 1981 to date [1984], 220 ppm. and 1.2%, respectively.

To accomplish this significant but yet not entirely satisfactory reduction from, say, prior to 1970 to date, motor vehicles currently include the following components for providing the combustible mixture and for inhibiting pollution from the resulting exhaust gases:
(1) catalytic converter
(2) exhaust gas recirculator (EGR)
(3) air injection reactor (AIR)
(4) carburetor
(5) preheat tube
(6) Vapor canister
(7) heat riser
(8) pump With all of these elements, some pollution still occurs, which pollution, within prescribed limits, is in fact tolerated for purposes of state inspection and the right to operation on state highways.

The present invention, on the other hand, employs only three essential elements: (1) pump; (2) pressure regulator; and (3) heat exchanger. No carburetor, catalytic converter, etc. are required.

Even assuming for the moment that the present invention provided no greater results than those obtainable with today's vehicles containing the above equipment, the reduction in number of essential components provides a very substantial cost savings in manufacture. Moreover, there is a reduction in total weight inherent with the use of fewer components.

It will thus be seen that the present invention will provide very substantial savings in manufacture, even if the pollution control were no better. However, as stated previously, pollution control in accordance with this invention is in fact superior to that obtainable previously, perfect or substantially perfect combustion being obtainable. Accordingly, it will be seen that the present invention in fact provides better results with less parts and cost for production.

Axiomatic with the reduction in parts is the subsequent reduction in cost and aggravation of repair or replacement of parts during the life of the engine.

In view of the clean combustion obtained by the present invention, certain other important advantages are also obtained. The engine is cleaner and both the engine and spark plugs will have longer life. More horsepower and more rapid acceleration are obtainable. There is no adverse affect on mileage (miles per gallon). In fact, slightly but not significantly higher mileage has been observed on the aforementioned test vehicle. Finally, it will be noted that the present invention permits the use of lower octane fuels which are less costly to produce.

Since certain changes may be made without departing from the scope of the invention herein involved, it is intended that all matter shown in the accompanying drawing and described in the foregoing specification shall be interpreted as illustrative and not in a limiting sense.

What is claimed is:

1. A combination of a gasoline internal combustion engine powered by a flammable gasoline fuel and having mixing chamber means wherein said fuel is admixed with air to form a combustible mixture for burning and operation of said engine; and means for introducing said air and fuel into said mixing chamber means to provide said combustible mixture, said means for introducing said fuel comprising:
(1) a source of flammable gasoline fuel and an air supply source;
(2) a pressure pump;
(3) conduit means for transporting said fuel in a liquid state from said fuel source to said pump;
(4) a heat exchanger adapted to heat said liquid fuel above its critical temperature, thereby converting said fuel to a gaseous state;
(5) conduit means for transporting at least a portion of the fuel from said pressure pump under pressure to said heat exchanger; and
(6) expansion valve means through which said fuel in said gaseous state is discharged, said expansion valve means being adapted to regulate the rate of discharge of said fuel in said gaseous state into said mixing chamber means, said pressure from said pump being maintained until said fuel in said gaseous state is discharged from said heat exchanger and rapidly expands into said mixing chamber means for admixture with said air to form said combustible mixture.

2. A combination as defined in claim 1 including air valve means for introducing air from said air supply source into said mixing chamber means, said air valve means being adapted to regulate the rate of airflow therethrough.

3. A combination as defined in claim 1 wherein hot combustion gases formed by burning of said combustible mixture comprises the source of heat for said heat exchanger, said combination further including means for transporting said hot combustion gases to said heat exchanger for heating said fuel; and means for discharging said combustion gases from said heat exchanger to the ambient air.

4. A process for introducing a gasoline fuel into the mixing chamber of a combustion engine where it is admixed with air to provide an essentially completely combustible air-fuel mixture for burning and operation of said engine, thereby in turn providing an exhaust product of said combustion which is essentially free of pollutants caused by the incomplete combustion of said fuel, said process comprising the steps of:
(1) transporting liquid gasoline fuel under pressure from a source for said liquid fuel;
(2) heating said transported fuel above its critical temperature to convert said liquid fuel to a gaseous state while maintaining said pressure; and
(3) introducing while rapidly expanding said gaseous fuel directly into said mixing chamber through control valve means for admixture with air where said gaseous fuel rapidly expands to provide said essentially completely combustible mixture.

5. A process as defined in claim 4 wherein said pressure is at least substantially 80 pounds per squre inch.

6. A process as defined in claim 4 wherein said pressure is at least substantially 65 pounds per square inch.

7. A process as defined in claim 6 wherein said fuel is heated above about 675° F.

8. A process as defined in claim 4 wherein said exhaust product consists essentially of hot pollutant-free gases and said hot exhaust gases are circulated in heat exchange relationship with said liquid fuel, whereby to heat said fuel above its critical temperature.

9. A process as defined in claim 8 including the further step of discharging said pollutant-free exhaust gases to the atmosphere.

10. A combination of a gasoline internal combustion engine powered by a flammable gasoline fuel, including mixing chamber means wherein said fuel is admixed with air to form a combustible mixture for burning and operation of said engine; and means for introducing said fuel into said mixing chamber means and for providing for said combustible mixture, said means for introducing said fuel comprising:
(1) a source of flammable liquid gasoline fuel;
(2) heating means for heating said liquid fuel above its critical temperature, thereby converting said liquid fuel to a gaseous state;
(3) means for transporting said fuel in a liquid state under pressure from said fuel source to said heating means; and
(4) metering valve means interposed between said heating means and said mixing chamber means;
said fuel in said gaseous state passing through said metering valve means from said heating means into said mixing chamber means where said fuel in said gaseous state rapidly expands to form said combustible mixture.

11. A combination as defined in claim 10 wherein said heating means is adapted to heat said fuel above substantially 675° F.

12. A combination as defined in claim 10 wherein said heating means is adapted for raising the temperature of said fuel to at least substantially 700° F.

13. A combination as defined in claim 10 wherein said metering valve means has a small orifice through which said fuel in said gaseous state passes and rapidly expands into said mixing chamber means.

14. A combination as defined in claim 13 wherein said metering valve means comprises a needle expansion valve.

15. A combination as defined in claim 10 wherein said air is introduced into said mixing chamber means through air valve means adapted for regulating the rate of flow of said air therethrough.

16. A combination as defined in claim 15 wherein said air valve means comprises a butterfly valve.

17. A combination as defined in claim 10 wherein said heating means comprises a heat exchanger.

18. A combination as defined in claim 17 wherein hot combustion gases formed by burning of said combustible mixture comprises the source of heat for said heat exchanger, said combination further including means for transporting said hot combustion gases to said heat exchanger.

19. A combination as defined in claim 18 including means for discharging said combustion gases from said heat exchanger to the ambient air.

20. A combination as defined in claim 10 wherein said means for transporting said fuel under pressure comprises a high pressure fuel pump to which said fuel is transported through conduit means from said source; and means for transporting said fuel from said fuel pump to said heating means while maintaining said pressure.

21. A combination as defined in claim 20 wherein said means for transporting said fuel from said pump to said heating means comprises pressure regulator means for maintaining said pressure; conduit means for transporting said fuel from said pump to said pressure regulator means; and conduit means for transporting said fuel from said pressure regulator means to said heating means.

22. A combination as defined in claim 21 wherein said fuel pump and pressure regulator means are adapted for providing a pressure of at least substantially 65 pounds per sqaure inch.

23. A combination as defined in claim 22 wherein said fuel pump and said pressure regulator means are adapted for providing a pressure of at least substantially 80 pounds per square inch.

* * * * *